Sept. 16, 1958 L. E. RYALL 2,852,621

VOICE SWITCHING IN TELEPHONE TRANSMISSION SYSTEMS

Filed Nov. 18, 1952 2 Sheets-Sheet 1

Inventor
L. E. RYALL
By Young, Emery & Thompson
Attys.

Sept. 16, 1958 L. E. RYALL 2,852,621

VOICE SWITCHING IN TELEPHONE TRANSMISSION SYSTEMS

Filed Nov. 18, 1952 2 Sheets-Sheet 2

Inventor
L. E. Ryall
By Young, Emery & Thompson Attys.

2,852,621
Patented Sept. 16, 1958

2,852,621

VOICE SWITCHING IN TELEPHONE TRANSMISSION SYSTEMS

Leonard Ernest Ryall, Watford, England, assignor to Telephone Manufacturing Company Limited, London, England, a company of Great Britain Application November 18, 1952, Serial No. 321,075

Claims priority, application Great Britain November 19, 1951

15 Claims. (Cl. 179—170.6)

The present invention relates to improvements in or relating to voice switching in telecommunication systems and is particularly applicable to loudspeaking telephones or to telephone repeaters.

In voice switching systems it is important to switch over rapidly from one direction of communication to another so as to minimise clipping of the speech signals. An object of the present invention is to increase the switching speed and generally to improve voice switching systems.

I have described in British Patent Nos. 415,767, 416,-372 and 430,567 a method of voice switching in which control potentials are derived from the difference of current flowing in the anode circuits of two valves, the control grid potentials of which are dependent on capacitor charges derived from speech signals in the respective transmission circuits, whereby the control current flows in one direction or the other according as to whether the signals are being transmitted in one direction or the other. The control currents according to their direction control the open or closed condition of variable attenuation networks in the two paths. Such networks may comprise one or more dry plate rectifiers arranged as either shunt or series elements or both, so that when the path in one direction of communication is in substantially the no-loss condition the path in the other direction is in the high-loss condition and vice versa. The present invention is applicable particularly but not exclusively to such voice switching systems.

Also, in my co-pending British patent application No. 12,598/51 I have already described means for obtaining an improvement in the speed of voice switching. Such means comprise a common resistor-capacitor combination of comparatively short time constant inserted in both the transmit and receive rectified switching signal circuits. This enables the time constant of the receive switching signals to be reduced and as a result, and because, in the loudspeaking telephone system there described, full microphone switching sensitivity is available at all times independent of the direction of the voice switching control currents, the time taken for switching from receive to transmit conditions is unnoticeably short. On the other hand, switching from transmit to receive conditions, whilst improved, still takes a noticeable time, particularly if the received speech is rather weak and follows an interjection from the transmit path. It is desirable that the switching should revert to receive conditions immediately so that even following an interjection the switching is not detectable.

The reasons for this slightly longer time delay in switching from transmit to receive conditions as compared with switching in the opposite direction are:

(1) So long as the switch is in the transmit condition, the loss which is imposed on the receive side is common both to the switching and speech paths and so makes break-in difficult.

(2) The transmit switching time constant must be appreciable to bridge the gaps between words, as otherwise the switch would revert back to receive conditions, i. e. the quiescent condition. This time constant is determined by words and syllables with low energy content which produce a correspondingly small switching voltage and which have to be catered for, but this means that a word ending with a sound having a large energy content (or loud speech), which produces a large switching voltage, results in an unduly long hangover time of the switch.

An object of the present invention is to reduce the switching signal voltage so as to reduce the hangover time whilst preserving break-in facilities.

According to the invention this is effected by automatic volume control means which, in dependence on the voice switching control currents or potentials, operates to equalize or reduce the level of the switching signals coming from the speech path which for the time being is not suppressed which control means are substantially ineffective against break-in signals from whichever path is in the high-loss condition so that the full break-in facility is available. Such automatic volume control devices may be associated with switching signal circuits of each path, for example the "go" and "return" paths of a balanced two-way system, or may be associated with only one switching signal circuit in an unbalanced two-way system such as the loudspeaking telephone described in application No. 12,598/51, where it may be associated only with the switching signal circuit of the transmit path and not with that of the receive path.

Such an automatic volume control (A. V. C.) device (or devices) may be arranged to be dependent both on the polarity and magnitude of the potentials controlling the voice switches, in that the A. V. C. device or each A. V. C. device is effective to control the level of the switching signals coming from the respective speech path when the condition of the control potentials allows transmission in the respective speech path, and that, when effective, the controlling action of the said device is mutually dependent on the magnitude of the said voice switching potentials.

One form of the automatic volume control device comprises the combination of a transformer and a rectifier attenuating network, the transformer primary being connected across the respective switching signal circuit whilst rectifiers are connected in circuit with the secondary winding and with the points at which the voice switching potentials are developed, so as to reduce the voltage of the switching signals in dependence upon said voice switching potentials under the desired voice switching conditions.

It is preferred to employ the automatic volume control devices in a system where the voice switches are of the rectifier variable attenuation type, in which case the rectifiers of the, or each A. V. C. device are connected to appropriately chosen control voltage points in opposite polarity relation to the rectifiers of the respective voice switching attenuator network, i. e. so that for each path said respective retcifiers, on the one hand of the voice switch, and on the other hand of the automatic volume control device, are in opposite impedance relation with respect to said points.

Means are also provided for adjustment of the degree of control exercised by the automatic control device. Such means may comprise a potentiometer connected between the control voltage points serving the respective voice switching attenuator network, the attenuator network of the A. V. C. device being connected across part of the potentiometer resistance so that the switching voltage applied to the network may be reduced as required to ensure that a sufficient switching signal voltage is available to produce an adequate voice switching control voltage.

The invention will now be described in more detail, and by way of example, with reference to the accompanying drawings in which.

Figures 1, 2, 4:
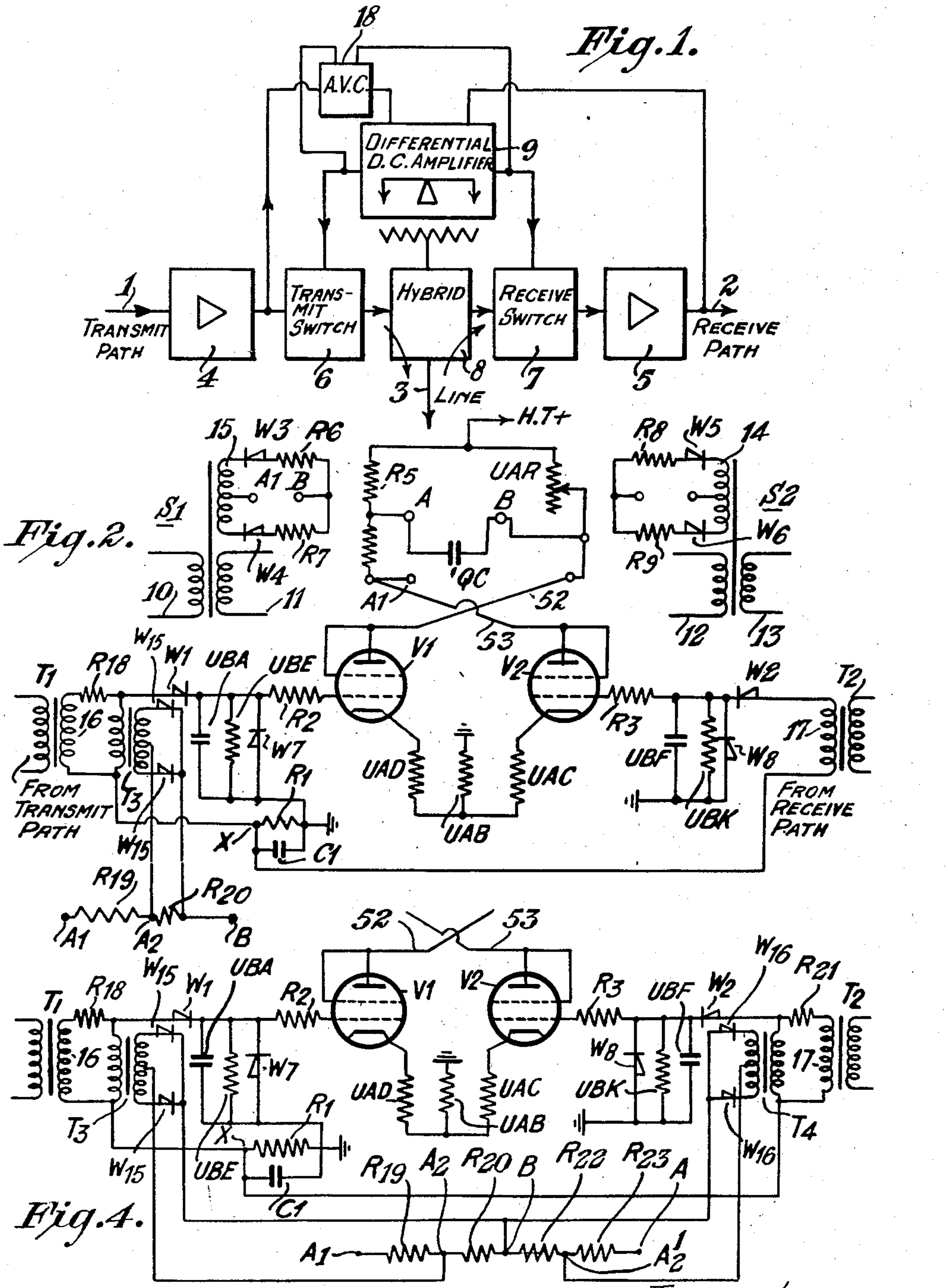
Fig. 1 is a block schematic diagram illustrating the manner of employing an automatic volume control device in one type of voice switching system.
Fig. 2 is a more detailed circuit schematic of a part of a voice switching system including a differential D. C. amplifier, variable attenuation voice switching networks and automatic volume control means.
Fig. 4 is a schematic circuit diagram of part of a voice switching system wherein an automatic volume control device is included for each path in a two-way circuit.

In Fig. 1 the system for effecting voice switching as between a transmit path 1, e. g. from a microphone, and a receive path 2, e. g. to a loudspeaker, connected to a line 3, comprises transmit and receive amplifiers 4 and 5, transmit and receive voice switches 6 and 7, a hybrid coil 8 linking the two paths with the line, and a differential D. C. amplifier 9 controlling the operation of the two switches. A part of the output of transmit amplifier 4 controls the differential amplifier 9 and a further part is transmitted to line via the transmit switch 6 and hybrid coil 8 in such a manner as to obtain a suitable frequency response characteristic between microphone and line. The receive voice switch 7 is connected to the input side of the receive amplifier 5, which controls the differential amplifier 9 and is connected to the receive path.

According to the invention an automatic volume control device 18 is connected in a manner to be described in more detail, across the differential amplifier output and in the path of the amplified switching signals. In the particular example here shown, the A. V. C. device is associated with one of the speech paths, i. e. the transmit path 1 for reasons which will be apparent from the description. In some cases, however, it may be desirable to arrange the A. V. C. means in a different manner, for example to have an A. V. C. device for each speech path.

Fig. 2 includes the schematic circuit of a differential D. C. amplifier used to control two voice switches of the variable attenuator type.

The amplifier consists of two valves $V_1$ and $V_2$ whose output is applied to the control points A, B.

There are two voice switches of the variable attenuator type indicated by $S_1$ and $S_2$ in the transmit and receive paths respectively, and these are operated differentially by the D. C. amplifier, i. e. when the transmit path is attenuated the receive path is open and vice versa. Consider for example switch $S_2$ in the receive path. Normally, when the switch is open speech signals in the receive path pass from transformer winding 12 to winding 13 and thence to load. The output of the amplifier at points A, B is connected to the corresponding points of switch $S_2$.

Application of a D. C. potential to points A and B of switch $S_2$ makes the rectifiers $W_5$, $W_6$ conducting or non-conducting according to polarity. In the conducting condition, the impedance presented to the centre tapped winding 14 is low and partially short circuits the load impedance at 13, and the signal is attenuated to an extent determined by resistors $R_8$, $R_9$. Reversal of the D. C. polarity at points A, B increases the rectifier impedance, so that winding 14 is virtually open circuited and signal energy from the source passes to the load with negligible attenuation. Points A and B of the switch are the balance points of a bridge formed by the two halves of winding 14 and the rectifiers and resistors $W_5$, $R_8$ and $W_6$, $R_9$ respectively. With substantial similarity between the rectifiers, negligible A. C. potential appears across points A and B.

The transmit switch $S_1$ operates in a similar manner to vary the transfer of signal energy in the transmit path from transformer winding 10 to the load winding 11, except that the rectifiers $W_3$ and $W_4$ are connected in the reverse sense to those of switch $S_2$ with respect to the amplifier output. Also transmit switch $S_1$ is connected to control points $A_1$, B, of the amplifier. If both networks were connected between the points A and B of the amplifier in opposite directions the total attenuation for zero control current in the amplifier output would be small and the system would be unstable. A resistor $R_4$ of about 30 ohms between A and $A_1$ ensures that when points A and B of the amplifier are at the same potential there is a control voltage between B and $A_1$ of approximately 0.5 volt, which provides adequate attenuation to prevent instability. The circuits are arranged such that there is a sufficient change in attenuation of the transmit and receive paths when the control voltage at points A. B. varies between $\pm 4.0$ volts.

Under normal conditions there is no potential difference between points A, B of the amplifier, which are the balance points of a bridge formed by resistor $R_5$, potentiometer UAP, and the resistor $R_4$ and the equivalent static anode resistances of valves $V_1$ and $V_2$. UAP permits accurate balancing of the bridge.

In operation, a portion of the speech energy in the transmit path is applied to transformer $T_1$, is rectified by $W_1$ and applied as a switching signal to the control grid of valve $V_1$ through a resistor $R_2$. Similarly speech energy in the receive path is applied to transformer $T_2$, is rectified by $W_2$ and is applied as a switching signal to the control grid of valve $V_2$.

Considering only the transmit path, the switching signal appears as a positive voltage at the control grid of $V_1$ whose anode current increases, and point A becomes more negative than B. This effect is further intensified by the connection of the cathodes of $V_1$ and $V_2$ to earth through resistor UAB, across which there is an increased potential difference due to the higher anode current of $V_1$. Consequently the cathode of $V_2$ becomes more positive relative to earth and, since the $V_2$ control grid is at earth potential, this grid becomes more negative with respect to its cathode. Hence, as the anode current of $V_1$ rises, that of $V_2$ falls, and the total potential difference between the points A and B is greater than it would be if only one valve were operating. The positive voltage applied to the control grid of $V_1$ is limited by grid current. This is advantageous in limiting to some extent the increase of discharge time of the capacitor UBA with increase of signal level in the transmit path.

Since the circuit is symmetrical, operation of it from the receive side is similar in effect, except that the output potential difference is reversed in polarity.

The amplifiers $V_1$ and $V_2$ may be separate from the speech amplifiers, or, as in the preferred embodiment, the amplifiers $V_1$ and $V_2$ may form one or more stages of the speech amplifiers. This is possible since, in the circuit of Fig. 2, the change in anode current of $V_1$ is limited by grid current, which ensures that the control grid voltage of $V_2$ does not vary outside the limits for satisfactory Class A amplification. Consequently valve $V_2$ may amplify the speech signals in the transmit path at the same time as valve $V_1$ is amplifying the rectified transmit switching signal to close the receive path against speech signals. Similarly, when the switching is reversed, $V_1$ may take part in amplifying the receive signals whilst $V_2$ amplifies the rectified portion of the receive signal to close the transmit path. Capacitor QC is connected across the output points A and B to reduce the leakage of signals from one path to the other.

In order to overcome the undesirable effect of signal leakage and coupling between the two paths, a resistor capacitor combination $R_1$, $C_1$ of short time constant as compared with the signal input R–C networks UBE, UBA, and UBF, UBK, is connected between point X common to the receive and transmit signal rectifier circuits and earth, as described in my co-pending British patent application No. 12,598/51. Such common resistor-capacitor combination enables the time constant of the switching signals to be reduced and hence improves the switching speed. However, for the reasons already stated above, the time taken for switching to transmit to receive conditions is still noticeably greater than for the opposite direction, particularly when following an interjection from the transmit path. To avoid this disparity in the speed of switching between the two directions, according to the invention, an automatic volume control device is provided as follows:

The transmit switching signal circuit is shunted by the primary winding of a transformer $T_3$. Across the secondary of the transformer is connected a rectifier attenuating network comprising a pair of rectifiers $W_{15}$ connected in a closed circuit in opposition to each other and to the ends of the secondary winding. The common junction point of the rectifiers $W_{15}$ is connected to the point B, corresponding to the similarly referenced point of the switching control voltage, while the mid-point of the transformer secondary winding is connected to the point $A_2$ lying on a potentiometer $R_{19}$, $R_{20}$ connected between those switching control voltage points A, and B to which the attenuator network of the transmit switch is connected. It will be observed that the conducting relation of the rectifiers $W_{15}$ to the points A, and B is opposite to the conducting relation of the rectifiers $W_3$ and $W_4$ of the main transmit attenuator network of voice switch $S_1$. Consequently, when the control voltage polarity is such that the rectifier elements $W_3$ and $W_4$ have a high impedance, i. e. the switch $S_1$ is open and the main transmit path is of low loss, the rectifiers $W_{15}$ of the A. V. C. device are forwardly biased and, therefore, of low impedance so that current flows therethrough in the forward direction and reduces the impedance of the primary circuit of transformer $T_3$, thereby reducing the level of the switching signal voltage rectified by $W_1$ and applied to the grid of valve $V_1$. Such reduction of switching signal voltage has a mutual reducing effect on the control voltage developed at the control points A and B, and the control effect as between the switching signal voltage at the grid of $V_1$ and the control voltage developed at points A, B is therefore automatic.

If the switching signal is reduced too severely by a small control voltage at points A, B, a state of switching voltage equilibrium may be reached due to unwanted signals in the receive amplifier providing a reverse switching voltage which almost balances the attenuated transmit switching signal voltage.

The potentiometer $R_{19}$, $R_{20}$, connected across the points A, B provides a means of controlling the voltage applied to the rectifier attenuating network of the A. V. C. device, thus ensuring that automatic control action is not too severe and that a sufficient switching signal level is available to produce an adequate voice switching control voltage at points A, B.

When the control voltage conditions at A, B, are such that the receive path is in low loss condition and the attenuation is applied to the transmit speech path, the impedance of rectifiers $W_{15}$ is high so that the associated transmit switching signal network connected to the grid of $V_1$ is of low loss. In other words, the automatic control is substantially ineffective, so that there is full transmit switching sensitivity available to give easy break-in of transmit speech to line via the microphone and transmit amplifier.

Figure 3:
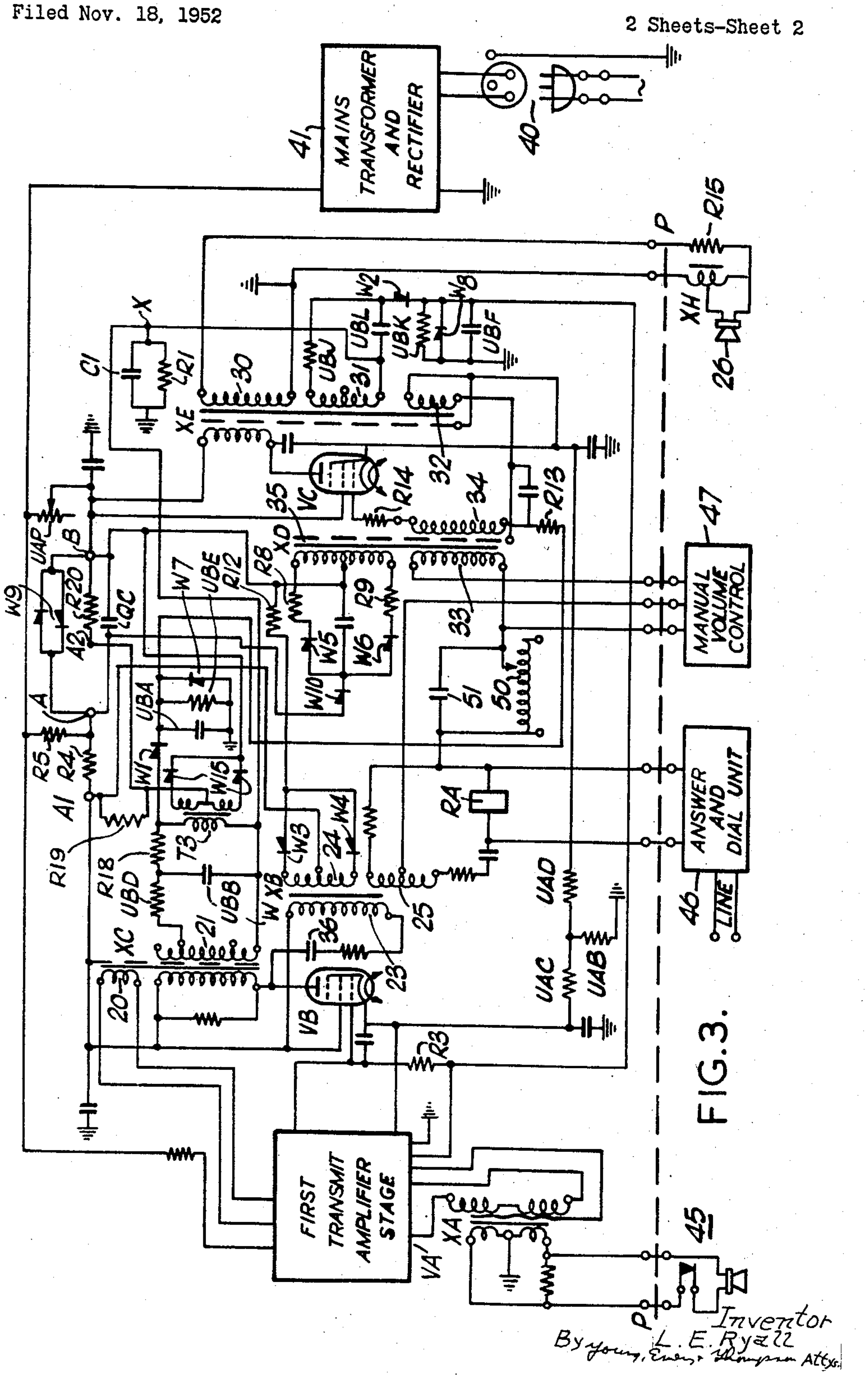
Fig. 3 is a part circuit and part block schematic diagram of a complete voice switching system including an automatic volume control device.

A circuit of a complete loudspeaking telephone system employing a voice switching system similar in principle to that in Fig. 2 and embodying the above described automatic volume control device, is shown in Fig. 3. In this system a valve in each of the speech amplifiers is also employed in the D. C. amplifier for the rectified switching signals. Except where specifically mentioned, components corresponding to those in Fig. 2 are indicated by like references. In this diagram the first transmit amplifier stage VA, the mains transformer and rectifier 41, the "answer and dial" unit 46 and the receive manual volume control 47 are indicated in block schematic and are not referred to herein in detail. In the following description, only those parts of Fig. 3 will be referred to which are necessary for an understanding of the invention, since a fuller description of the remaining parts of the circuit will be found in my co-pending British patent application No. 12,598/51.

Considering first the speech amplifying function, the transmit amplifier is a two-stage R–C coupled pentode amplifier comprising the first stage VA, valve VB and input transformer XA supplied by microphone 45. The amplifier employs approximately 20 db negative feedback over a major portion of the bandwidth, this being derived from winding 20 of the anode transformer XC. The output from VB is fed to line via secondary winding 25 of hybrid transformer XB.

The receive amplifier consists of input transformer XD, valve VC and output transformer XE whose winding 30 is connected to the loudspeaker 26. The primary winding 33 of XD is connected to line through hybrid transformer XB. The pentode VC employs about 12 db negative feedback over the major portion of the bandwidth, this being derived from secondary winding 32 of XE and applied in series with XD secondary winding 34.

Considering now the voice switching function, the differential D. C. amplifier consists of valve VB and resisters $R_4$ and $R_5$ on one side, with valve VC and potentiometer UAP on the other, the balance points for this bridge being A, B. Valves VB and VC therefore correspond to $V_2$ and $V_1$ of Fig. 2 so far as the switching function is concerned. The rectifiers $W_9$ connected across the points AB, prevent the control voltage at A, B rising to an unduly high value under fault conditions and possibly damaging the voice switch rectifiers $W_3$ to $W_6$.

The transmit attenuating network is formed by secondary winding 24 of XB (corresponding to winding 15 in Fig. 2) with associated rectifiers $W_3$, $W_4$, and is connected to point A through point $A_1$ and stabilizing resistor $R_4$ and to point B through resistor $R_{12}$.

Winding 35 of transformer XD (corresponding to winding 14 in Fig. 2) and the associated rectifier-resistor network $W_5$, $R_8$, $W_6$, $R_9$ forms the receive attenuating network, connected to points A, B, via rectifier $W_{10}$ on one side and directly on the other. So far as the conducting direction of the attenuator rectifiers is concerned the two attenuating networks are thereby connected to A, B in opposite senses.

On the receive side the voice rectifying network is that connected to XE secondary winding 31 (corresponding to winding 17 of $T_2$ in Fig. 2), so that rectified signals from line apply a positive bias to VB grid through resistor $R_3$, thus unbalancing the D. C. amplifier bridge in the manner described above with reference to Fig. 2 and in such a sense that current flows through the rectifiers $W_3$, $W_4$ connected to XB winding 24. The hybrid transformer XB is, therefore, in effect short circuited, with the result that signals from the transmit amplifier cannot pass to line.

For the reverse operation, signals from the transmit amplifier are rectified by the network connected to XC winding 21. By comparison of Figures 2 and 3 it will be seen that secondary winding 21 of transformer XC in Fig. 3 corresponds to winding 16 of transformer $T_1$ in Fig. 2. The resulting positive switching bias applied to VC grid through resistor $R_{13}$, winding 34 and resistor $R_{14}$ (equivalent to the resistance of $R_2$ in Fig. 2), unbalances the bridge in the opposite sense to that just described, so that rectifiers $W_5$, $W_6$ are conducting and XD is now short circuited but XB is not. Signals can now pass from the transmit amplifier to line, but those from line may not pass to the receive amplifier.

Resistor UBD and capacitor UBB in the transmit switching path and their counterparts UBJ and UBL in the receive switching path in Fig. 3, are optional and are used to obtain frequency discrimination of the switching sensitivity.

Contemporary with these voice switching operations the A. V. C. device described above, with reference to Fig. 2, and shown here as connected across the transmit switching signal network associated with secondary 21 of rectifier XC, is energised, during the low loss periods of the transmit path, by the control voltage at points A, B, as already described.

The losses in decibels applied to the transmit switching signal circuit, for varying control voltages applied to the A. V. C. attenuator network associated with the transformer $T_3$ in accordance with the invention, increase substantially as the control voltage increases. With the A. V. C. circuit as described arranged to give these losses and associated with the loud-speaking telephone circuit of Fig. 3, the control voltage obtained for any speech input signal to the microphone 45 can readily be arranged to be sufficient to ensure that the transmit rectifier network ($W_3$, $W_4$) associated with the hybrid transformer XB is capable of handling the speech signal applied thereto without causing signal limiting due to inadeqaute control current voltage. The A. V. C. device may be employed also in the voice switching systems described in my Britich Patents Nos. 415,767, 416,372, 430,567.

The automatic volume control device is preferable to a peak limiter, as with the former the relative fluctuations in the speech energy are retained, that is to say the switching signals coming from the speech energy of the quiet syllables as well as those coming from the loud syllables are reduced in level so that break-in from the receive side is more readily possible than with a peak limiter which would not act to reduce the weak syllable signals.

The invention is of particular value when associated with the common resistor-capacitor combination $R_1C_1$, in the rectified switching signal circuits as described above and in my co-pending British patent application No. 12,598/51. The inhibiting action applied to the receive rectifier $W_2$ by the voltage developed across the common resistor-capacitor combination $R_1C_1$, due to speech into the microphone, will disappear during weak syllable periods as the inhibiting voltage across the common resistor-capacitor combination discharges much more rapidly due to its short time constant than does the main transmit switching signal voltage, which has an associated time constant many times as long.

It has been found as a result of direct comparisons of a loud speaking telephone circuit with and without the automatic volume controlling device, that the quality and volume of the transmit speech is unchanged and that there is no practicable change in transmit switching sensitivity, this being quite adequate under both conditions. There is however a definite improvement in break-in from the line with weak speech, which is of particular importance if the instrument is to be used on the public telephone service, or where intermittent noise is liable to occur in the vicinity of the microphone.

If the reverse resistance of the rectifiers $W_1$ and $W_2$ is not very high compared with that of resistors UBE and UBK then a portion of the negative potential obtained at the junction point X when speech energy is being rectified, say by the transmit rectifier $W_1$ may be transferred via the reverse resistance of the other rectifier to the control grid circuit of the transmit speech amplifying valve VB, and may produce excess negative grid voltage bias distorting the amplification. This can be avoided by shunting the resistors UBE and UBK by rectifiers $W_7$ and $W_8$ such that the conducting direction is from earth to any negative potential that may be obtained across UBE and UBK and so preventing any excess negative potential from being obtained. These rectifiers do not prevent the normal production of a positive grid bias voltage as described above.

For the reasons given above, the A. V. C. device is associated only with one switching channel, namely the transmit switching channel, in a loudspeaking telephone system such as that exemplified by Fig. 3. Similar considerations do not apply in balanced systems in which the "go" and "return" transmission channels may have substantially identical characteristics, so that neither channel would be low-loss in the quiescent state. In such cases an A. V. C. device may be associated with each switching channel. Such an arrangement is indicated in Fig. 4, wherein the layout of the switching signal circuits is generally the same as that in Fig. 2, and corresponding references are employed, with the exception that an A. V. C. device is employed for both the transmit and the receive switching channels. The A. V. C. device for the receive switching channel comprises the transformer $T_4$ and rectifiers $W_{16}$ associated with the receive switching signal circuit in a manner equivalent to that in which the transformer $T_3$ and rectifiers $W_{15}$ are associated with the transmit side. Each A. V. C. device is associated with the control voltage points for its individual voice switch. The transmit A. V. C. device is connected to points $A_2$ and B of the potentiometer $R_{19}$ $R_{20}$ between the control voltage points $A_1$, B. The receive A. V. C. device is connected to points $A_2^1$ and B of another potentiometer $R_{22}$, $R_{23}$ connected between the control voltage points A and B. The pairs of rectifiers $W_{15}$ and $W_{16}$ are connected in opposite conducting relation to the point on the respective control voltage potentiometers so that the A. V. C. devices are operative alternately to control the level of the switching signals coming from the respective paths according to the direction of voice switching.

I claim:

1. A telecommunication system including at a terminal thereof transmit and receive signalling paths, voice-operated switching means for controlling the loss in said respective signal paths including means for deriving switching signals from speech signals in said respective paths, means for producing a control voltage in response to the relative levels of said derived switching signals including two amplifying devices, an input circuit for each amplifying device arranged to receive said respective switching signals, said input circuits having time delay characteristics influencing the hangover time of an existing switching condition, and automatic volume control means connected in one of the said input circuits and with the points between which said control voltage is produced, said automatic volume control means containing an attenuator network including asymmetrically conducting elements which are forwardly or backwardly biased according to the polarity of the control voltage to vary the impedance of said attenuator network and hence the resultant attenuation produced by the said attenuator network in the switching signals in said one input circuit whereby the control voltage exercises automatic control over the level of said switching signals.

2. A telecommunication system including at a terminal thereof transmit and receive signalling paths, voice-operated switching means for controlling the loss in said respective signal paths including means for deriving switching signals from speech signals in said respective paths and amplifying means for producing a control voltage in response to the relative levels of said derived switching signals including two input circuits for receiving said respective switching signals, said amplifier input circuits having time delay characteristics influencing the hangover time of an existing switching condition set up by the control voltage, and automatic means for controlling the relative switching sensitivity of the said two signal paths, said automatic control means including a rectifier attenuator network connected in one of the said amplifier input circuits and with the points between which said control voltage is produced, so as to attenuate the switching signals in said one amplifier input circuit, the impedance of and hence the resultant attenuation produced by the said attenuator network being variable dependent upon the polarity of the control voltage.

3. A telecommunication system including at a terminal thereof transmit and receive paths, a voice operated switch for controlling each of said paths, amplifying means for differentially controlling said voice switches including an output circuit having control voltage points controlling said voice switches, two input circuits deriving switching signals from said respective paths said input circuits having time delay characteristics influencing the hangover times of the respective voice switching conditions and automatic volume control means associated with said control voltage points and at least one of said input circuits to control the level of said switching signals, said automatic volume control means including a rectifier attenuator network whose impedance is low for one polarity of the control voltage to permit the volume control to be effective when voice switching has been effected in the direction allowing transmission in the signal path appropriate to the said input circuit and whose impedance is high for the opposite polarity of the control voltage corresponding to the reverse condition of voice switching.

4. A telecommunication system including at a terminal thereof transmit and receive paths, voice operated switching means for controlling the loss in said respective signal paths including amplifying means, two input circuits for said amplifying means adapted to derive switching signals from the speech energy in said respective paths, said input circuits having time delay characteristics influencing the hangover times of the respective switching conditions, an output circuit producing a control voltage dependent on the relative levels of said switching signals and automatic volume control means comprising a rectifier attenuator network connected between the control voltage points and that one of the said input circuits associated with the transmit path, said rectifier attenuator network having a high impedance for one polarity of the control voltage and a low impedance for the opposite polarity, which low impedance varies with the magnitude of the control voltage to control the level of the switching signals in the said input circuit.

5. A telecommunication system having voice-operated switches for controlling the conditions in two respective signal paths such that one path is in the low loss condition whilst the other is in the high loss condition, and vice versa, and including at a terminal thereof amplifying means having an output circuit producing a control voltage for operating the voice switches and two input circuits to which are applied switching signals derived from the signals in said respective paths, time delay circuits associated with said input circuits whose time constants and the switching signal levels determine the hangover time of an existing switching condition, and automatic volume control means comprising a rectifier attenuator network connected between at least one of the said input circuits and points at which the said control voltage is produced, the impedance of said rectifier attenuator network being dependent on the polarity and magnitude of the control voltage such that the control voltage exercises automatic control over the level of the switching signals in only one of the said input circuits at any one time.

6. In a voice-switched telecommunication system having separate transmit and receive speech paths at a terminal thereof and separate switching signal paths deriving energy from said speech paths and in which the direction of switching is controlled in accordance with the changing polarity of a control voltage produced between control points in response to the relative levels of said switching signals, the provision of means for automatically controlling the switching sensitivity of the system in response to speech signals in one path as compared with the switching sensitivity in response to speech signals in the other path, said means comprising a variable attenuator network connected to the control voltage points and included in one of said switching signal paths so as to attenuate the switching signals therein for the corresponding direction of voice switching.

7. A telecommunication system as claimed in claim 6 having voice operated switching means associated with transmit and receive speech paths and having means for deriving switching signals from a portion of the transmit path which is always in a low-loss condition and means for deriving switching signals from a portion of the receive path which is in a high loss condition when the transmit path has been seized, the said automatic volume control means being effective to control the switching signal level from the transmit path to favour improved break-in from the receive path.

8. A telecommunication system including at a terminal thereof voice-operated switches for controlling the conditions in two respective signal paths such that one path is in the low loss condition whilst the other is in the high loss condition and vice versa comprising two amplifying devices having an output circuit developing a control voltage for operating the voice switches and two input circuits to which are applied switching signals derived from the signals in said respective paths, time delay circuits associated with said input circuits whose time constants and the switching signal levels determine the hangover time of an existing switching condition, and an automatic volume control device associated with at least one of the said switching signal input circuits and dependent on the polarity and magnitude of the control voltage, said automatic volume control device comprising a rectifier attenuator network coupled to the switching signal input circuit of the respective amplifying device and connected to the respective control voltage points in such a manner that when the control voltage permits a low loss condition sufficient for speech transmission in the speech path associated with the said signal input circuit the said attenuator network is of low impedance and attenuates the switching signal voltage applied to the valve input for high level signals in said speech path.

9. A telecommunication system as claimed in claim 6 wherein the switching signals are applied to the input circuits of two amplifying devices whose outputs develop a D. C. control voltage the polarity of which alternates to operate the voice switches, and the attenuator network is subject to the polarity and magnitude of the said D. C. control voltage to control the level of switching signals derived from the transmit speech path and applied to the input circuit of one of said amplifying devices.

10. A telecommunication system as claimed in claim 6 wherein the switching signals are applied to the input circuits of two amplifying devices whose outputs develop said control voltage whose condition determines the direction of voice switching, and the automatic control means comprise an attenuator network associated individually with each respective switching signal channel and with the control voltage points such that each of said attenuator networks is effective to control the level of the switching signals coming from its individual speech channels as the direction of voice switching is changed.

11. A telecommunication system as claimed in claim 8 including means for adjustment of the automatic volume control effect on the switching signals derived from a speech signal path, comprising a potentiometer connected across the control voltage points to which is connected the respective rectifier attenuator network for the switching signal input circuit.

12. A telecommunication system according to claim 8 wherein each voice switch comprises a rectifier variable attenuation network associated with the respective signal path, said networks being connected in opposite conducting relation with the control voltage points, and the rectifier attenuating network of the automatic volume control device is connected to the control voltage points in reverse conducting sense to that one of the voice switching rectifier networks which is associated with the same speech signal path as the automatic volume control device.

13. A telecommunication system as claimed in claim 8 wherein the automatic volume control device comprises a transformer having a primary winding connected across the said switching input circuit of the respective amplifying device and having a secondary winding connected to a pair of rectifiers whose common point and the centre point of the secondary winding are adjustably connected to the respective control voltage points.

14. A telecommunication system including voice switches of the rectifier variable attenuation type, wherein switching signals derived from the speech signals in two different transmission parths are applied to the input circuits of two amplifying valves whose time constants determine the hangover time of the switching signals for the respective voice switching conditions, and whose outputs develop a control voltage applied to said variable attenuating networks to determine the voice switching conditions, and including automatic volume control means for controlling the level of switching signals in at least one of said switching signal input circuits, the said automatic volume control means associated with the switching signal circuit comprising a transformer connected across said input circuit and a further rectifier attenuating network connected to the control voltage points and arranged to reduce the impedance of the primary winding of the said transformer and thereby to reduce the switching signal level when the voice switching conditions are such as to maintain low loss in the speech circuit from which said switching signals are derived.

15. A telecommunication system as claimed in claim 14 having "transmit" and "receive" paths and wherein the transmit condition of voice switching imposes a loss on the receive speech path and on the receive switching signal path, whilst the transmit switching signal path is in the low loss condition for all voice switching conditions, and wherein the automatic volume control device is arranged to control the level of the transmit switching signals when the voice switching conditions favour the "transmit" path.

References Cited in the file of this patent

UNITED STATES PATENTS

| | | |
|---|---|---|
| 2,223,200 | Augustadt | Nov. 26, 1940 |
| 2,251,028 | Barney | July 29, 1941 |
| 2,273,945 | Fisher | Feb. 24, 1942 |
| 2,282,405 | Herrick | May 12, 1942 |
| 2,306,689 | Davis et al. | Dec. 29, 1942 |